(12) United States Patent
Gasparakis et al.

(10) Patent No.: US 10,382,344 B2
(45) Date of Patent: Aug. 13, 2019

(54) GENERATING AND/OR RECEIVING AT LEAST ONE PACKET TO FACILITATE, AT LEAST IN PART, NETWORK PATH ESTABLISHMENT

(71) Applicant: Intel Corporation, Santa Clara, CA (US)

(72) Inventors: Iosif Gasparakis, Tigard, OR (US); Mark D. Gray, Dublin (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/645,955

(22) Filed: Jul. 10, 2017

(65) Prior Publication Data

US 2017/0310600 A1  Oct. 26, 2017

Related U.S. Application Data

(63) Continuation of application No. 14/961,182, filed on Dec. 7, 2015, now abandoned, which is a continuation
(Continued)

(51) Int. Cl.
*H04L 12/851* (2013.01)
*H04L 12/26* (2006.01)
*H04L 29/06* (2006.01)

(52) U.S. Cl.
CPC ........ *H04L 47/2441* (2013.01); *H04L 43/026* (2013.01); *H04L 47/24* (2013.01);
(Continued)

(58) Field of Classification Search
CPC ... H04L 47/2441; H04L 43/025; H04L 47/24; H04L 47/2408; H04L 69/22
See application file for complete search history.

(56) References Cited

U.S. PATENT DOCUMENTS

| 6,046,890 A | 4/2000 | Yamada et al. |
| 7,215,641 B1 * | 5/2007 | Bechtolsheim ..... H04L 47/2441 370/235 |

(Continued)

FOREIGN PATENT DOCUMENTS

| CN | 101753388 A | 6/2010 |
| WO | 2013169258 A1 | 11/2013 |

OTHER PUBLICATIONS

Chinese Office Action in Chinese Patent Application No. 201280073090.6 dated Sep. 1, 2017, 16 pages (including translation).
(Continued)

*Primary Examiner* — Duc C Ho
(74) *Attorney, Agent, or Firm* — Alliance IP, LLC (57) ABSTRACT

An embodiment may include circuitry to be included, at least in part, in at least one node in a network. The circuitry may generate, at least in part, and/or receive, at least in part, at least one packet. The packet may be received, at least in part, by at least one switch node in the network. The switch node may designate, in response at least in part to the packet, at least one port of the switch node to be used to facilitate, at least in part, establishment, at least in part, of at least one path for propagation of at least one flow between at least two other nodes in the network. The packet may be generated based at least in part upon (1) at least one application classification, (2) at least one allocation request, and (3) network resource availability information.

24 Claims, 4 Drawing Sheets

Related U.S. Application Data of application No. 13/915,706, filed on Jun. 12, 2013, now Pat. No. 9,210,039, which is a continuation-in-part of application No. PCT/US2012/037329, filed on May 10, 2012.

(52) U.S. Cl.
CPC .......... *H04L 47/2408* (2013.01); *H04L 69/22* (2013.01); *Y02D 50/30* (2018.01)

(56) References Cited

U.S. PATENT DOCUMENTS

| | | | |
|---|---|---|---|
| 7,310,480 | B2 | 12/2007 | Maciocco et al. |
| 7,369,557 | B1 | 5/2008 | Sinha |
| 9,785,466 | B2 * | 10/2017 | Chin .................... G06F 9/4881 |
| 2002/0027887 | A1 | 3/2002 | Moriya |
| 2002/0136202 | A1 | 9/2002 | Droz et al. |
| 2003/0126297 | A1 | 7/2003 | Olarig et al. |
| 2004/0156313 | A1 | 8/2004 | Hofmeister et al. |
| 2005/0074001 | A1 | 4/2005 | Mattes et al. |
| 2008/0002681 | A1 | 1/2008 | Bajic et al. |
| 2009/0067431 | A1 | 3/2009 | Huang et al. |
| 2010/0020726 | A1 | 1/2010 | Chu et al. |
| 2011/0310894 | A1 | 12/2011 | Karino |
| 2011/0317559 | A1 | 12/2011 | Kern |
| 2012/0020361 | A1 | 1/2012 | Ueno |
| 2012/0113871 | A1 | 5/2012 | Bulusu |
| 2013/0039204 | A1 | 2/2013 | Dorize et al. |
| 2013/0301475 | A1 | 11/2013 | Gasparakis et al. |
| 2013/0343229 | A1 | 12/2013 | Gasparakis |
| 2014/0025823 | A1 | 1/2014 | Szabo et al. |
| 2014/0153568 | A1 | 6/2014 | Gasparakis |

OTHER PUBLICATIONS

Chinese Office Action in Chinese Patent Application No. 201280073090.6 dated Jan. 6, 2017, 11 pages.
Final Office Action in U.S. Appl. No. 14/961,182 dated Feb. 9, 2017.
IP Precedence, TOS, & DSCP, received on Apr. 4, 2013 from http://bogpeople.com/networking/dscp.shtml, 3 pages.
Nichols, et al., RFC 2474, Definition of the Differentiated Services Field (DS Field) in the 1Pv4 and 1Pv6 Headers, Network Working Group, Dec. 1998, 19 pages.
Non Final Office Action dated Jan. 29, 2015 in U.S. Appl. No. 13/915,706, 9 pages.
Non Final Office Action in U.S. Appl. No. 13/915,706 dated Jan. 29, 2015 (6 pages).
Non Final Office Action in U.S. Appl. No. 13/915,706 dated May 12, 2015 (5 pages).
Non Final Office Action in U.S. Appl. No. 14/961,182 dated Jul. 14, 2016 (9 pages).
Notice of Allowance in U.S. Appl. No. 13/915,706 dated Aug. 14, 2015 (8 pages).
Office Action received in U.S. Appl. No. 13/995,978, dated Mar. 13, 2015, 18 pages.
OpenFlow Switch Specification, Version 1.1.0 Implemented (Wire Protocol Ox02), Feb. 28, 2011, 56 pages.
Resource Reservation Protocol, retrieved on May 31, 2013 from http:f/en.wikipedia.org/wiki/Resource_Reservation_Protocol, 8 pages.
RFC 791, Internet Protocol, DARPA Information Processing Techniques Office, Sep. 1981, 44 pages.
Third Office Action for Chinese Patent Application No. CN201280073090.6 dated Apr. 26, 2018, 7 pages.

* cited by examiner

GENERATING AND/OR RECEIVING AT LEAST ONE PACKET TO FACILITATE, AT LEAST IN PART, NETWORK PATH ESTABLISHMENT

RELATED APPLICATIONS

This application is a continuation of (and claims the benefit of priority under 35 U.S.C. § 120) U.S. patent application Ser. No. 14/961,182, filed Dec. 7, 2015, entitled "GENERATING AND/OR RECEIVING AT LEAST ONE PACKET TO FACILITATE AT LEAST IN PART, NETWORK PATH ESTABLISHMENT", which is a continuation of U.S. patent application Ser. No. 13/915,706, filed Jun. 12, 2013, now U.S. Pat. No. 9,210,039 granted Dec. 8, 2015, entitled, "GENERATING AND/OR RECEIVING AT LEAST ONE PACKET TO FACILITATE AT LEAST IN PART, NETWORK PATH ESTABLISHMENT" which is a continuation-in-part of prior co-pending International Application No. PCT/US2012/037329, filed May 10, 2012, designating the United States of America, entitled "NETWORK ROUTING BASED ON RESOURCE AVAILABILITY". The disclosures of the prior Applications are considered part of and are incorporated by reference in the disclosure of this Application.

TECHNICAL FIELD

Embodiments disclosed herein generally relate to generating and/or receiving one or more packets that may be used to facilitate, at least in part, establishment of one or more paths for propagation of one or more flows in a network.

BACKGROUND

In one conventional system, different flows in a network are assigned different quality of service (QOS) parameters. Gateway nodes in the network provide different processing to the different flows depending upon the particular QOS parameters assigned to the flows. For example, depending upon the particular QOS parameters assigned to two respective flows, the processing provided by the gateway nodes to one of the two flows may result in it being processed with less latency, imparted less jitter, etc. than the other of the two flows.

In typical implementation, as the number of different flows having different QOS parameters increases, the gateway nodes may become processing bottlenecks in the network. This limits the scalability of this conventional network, the number of flows that can be practically processed by this conventional network, and/or the number of such flows that can be practically differentiated based upon QOS parameters in this conventional network.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DESCRIPTION OF EMBODIMENTS

Figure 1:
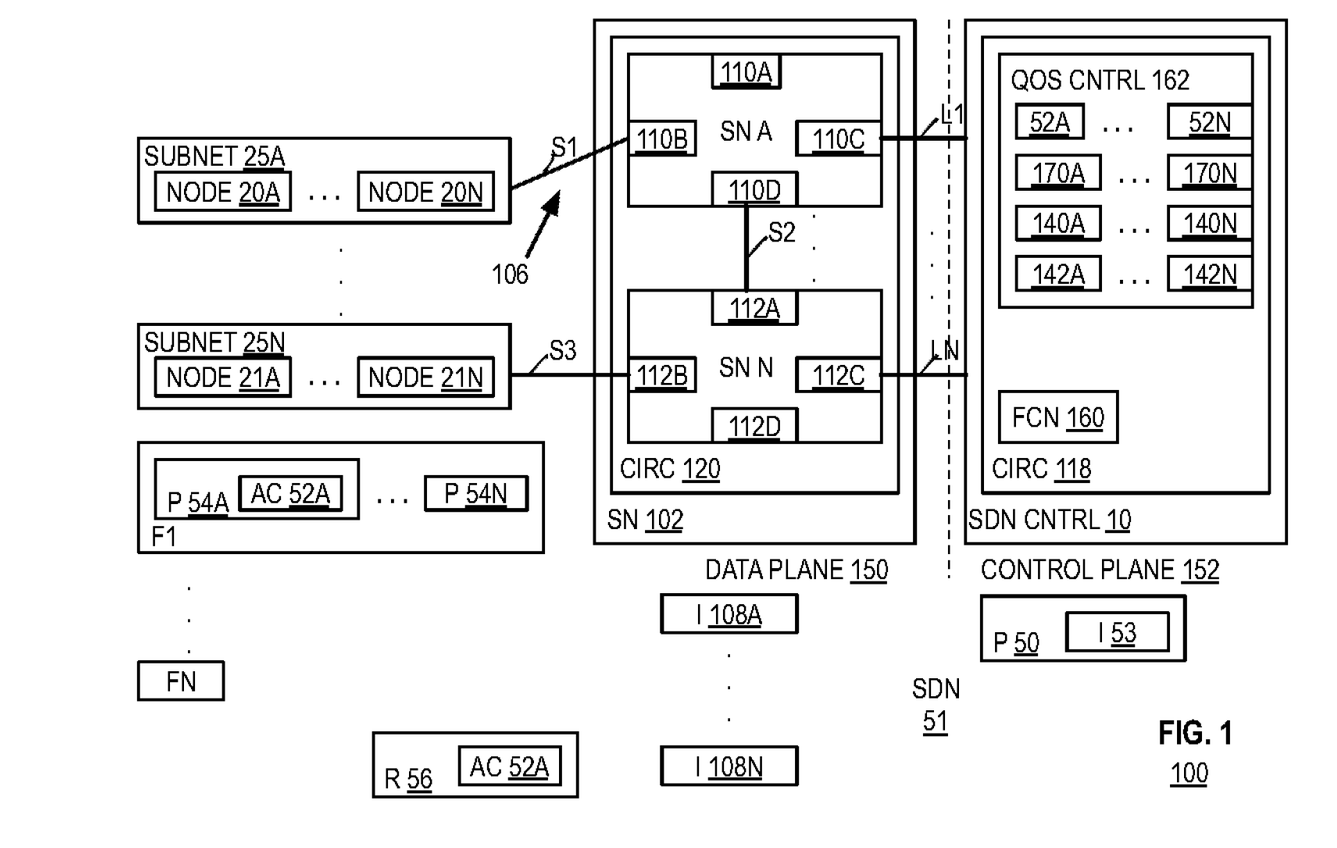
FIG. 1 illustrates elements in an embodiment.

FIG. 1 illustrates a system embodiment 100. System 100 may include, at least in part, software-defined network (SDN) 51. SDN 51 may comprise, at least in part, data plane 150 and/or control plane 152.

In this embodiment, data plane 150 may comprise one or more (and in this embodiment, a plurality of) subnets 25A . . . 25N that may be communicatively coupled, at least in part, to one or more switch nodes (SN) 102. In this embodiment, one or more SN 102 may comprise circuitry 120 that may comprise a plurality of communicatively coupled SN (e.g., SN A . . . SN N). Each of the switch nodes SN A . . . SN N may comprise a respective plurality of ports. For example, SN A may comprise ports 110A, 110B, 110C, and/or 110D. Also, for example, SN N may comprise ports 112A, 112B, 112C, and/or 112D.

Each of the subnets 25A . . . 25N may comprise one or more (and in this embodiment, a plurality of) nodes. For example, one or more subsets 25A may comprise nodes 20A . . . 20N. Also, for example, one or more subnets 25N may comprise nodes 21A . . . 21N.

In this embodiment, control plane 152 may comprise one or more SDN controller nodes 10 that may be communicatively coupled, at least in part, to one or more SN 102 via one or more (and in this embodiment, a plurality of) communication links L1 . . . LN. For example, one or more links L1 may communicatively couple one or more controllers 10 to one or more switch nodes SN A via one or more ports 110C of one or more switch nodes SN A. Also, for example, one or more links LN may communicatively couple one or more controllers 10 to one or more switch nodes SN N via one or more ports 112C of one or more switch nodes SN N.

One or more controller nodes 10 may be capable of comprising, at least in part, circuitry 118. Circuitry 118 that is to be comprised, at least in part, in one or more nodes 10 may comprise, at least in part, one or more fabric controller nodes 160 and/or one or more quality of service (QOS) controller nodes 162.

In this embodiment, a "computer," "host," "server," "client," "node", and/or "device" may be used interchangeably, and may be or comprise, at least in part, for example, one or more end stations, smart phones, tablet computers, appliances, communication instrumentalities, intermediate stations, network interfaces, clients, servers, storage, mass storage, and/or components and/or portions thereof. In this embodiment, a subnet may be or comprise one or more portions of a network that may be accessible via a segment of the network that is communicatively coupled to one or more intermediate stations, such as, for example, via one or more ports of one or more switch nodes. In this embodiment, a "segment," "network," "channel", "communication link," and/or "communication lane" may be used interchangeably, and may be or may comprise, for example, one or more virtual, physical, and/or logical mechanisms, instrumentalities, modalities, and/or portions thereof that may permit, facilitate, and/or allow, at least in part, two or more entities to be communicatively coupled together.

In this embodiment, an SDN may be or comprise, at least in part, one or more networks whose operation, features, and/or configuration may be definable and/or controllable, at least in part, by one or more software processes (e.g., one or more such processes executed, at least in part, by and/or residing in, at least in part, one or more controller nodes). For example, in this embodiment, a SDN may comprise, at least in part, a control plane and a data plane that are mutually distinct, at least in part, from each other. Also, for example, the control plane may comprise one or more such controller nodes. A controller node may be capable, at least in part, of controlling one or more operations of one or more switch nodes in the data plane, via, based upon, and/or as a result, at least in part, of being able to specify, modify, provide, and/or control use of, at least in part, one or more forwarding tables used by the one or more switch nodes.

In this embodiment, a control plane may be or comprise circuitry that is capable, at least in part, of controlling, at least in part, one or more operations of a data plane. In this embodiment, a data plane may be or comprise one or more switch nodes communicatively coupled, at least in part, to at least two other nodes. In this embodiment, a switch node may be or comprise, at least in part, at least one switch.

In this embodiment, a first entity may be "communicatively coupled" (at least in part) to a second entity if the first entity is capable, at least in part, of transmitting to and/or receiving from the second entity one or more packets. In this embodiment, a packet may comprise, at least in part, one or more symbols, values, and/or characters that may embody, represent, and/or indicate, at least in part, one or more commands and/or data. Also in this embodiment, a "wireless network" may be or comprise a network that permits, at least in part, at least two entities to be wirelessly communicatively coupled, at least in part. In this embodiment, a "wired network" may be or comprise a network that permits, at least in part, at least two entities to be communicatively coupled, at least in part, via non-wireless means, at least in part. In this embodiment, data may be or comprise one or more commands (for example, one or more program instructions), and/or one or more such commands may be or comprise data. Also in this embodiment, an instruction may include data and/or one or more commands. Similarly, in this embodiment, data may include one or more instructions and/or one or more commands.

In this embodiment, a port may be or comprise at least one physical, logical, and/or virtual entity that may be capable, at least in part, of being used (1) to communicatively couple, at least in part, the at least one entity to at least one other entity (such as, for example, without limitation, one or more virtual machines (VM) and/or other processes, and/or (2) to interact, at least in part, with the at least one other entity. In this embodiment, a switch may be or comprise circuitry that is capable, at least in part, of forwarding, at least in part, at least one packet. In this embodiment, forwarding may be or comprise receiving, at least in part, at least one packet via at least one port, and transmitting, at least in part, the at least one packet via at least one other port. In this embodiment, a portion, subset, or component of an entity may comprise all or less than all of the entity. Also, in this embodiment, an agent, process, program, driver, operating system, VM, virtual machine monitor (VMM), and/or application may comprise and/or result at least in part from execution of one or more program instructions.

Additionally in this embodiment, a VMM process may be or comprise, at least in part, at least one process involved, at least in part, in managing, controlling, and/or modifying one or more features, functions, and/or operations of one or more virtual machines. In this embodiment, a VM may be or comprise, at least in part, a node that is capable, at least in part, of executing two or more operating systems contemporaneously, at least in part.

As used herein, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, processor core, core, and controller each may comprise respective circuitry capable of performing, at least in part, one or more arithmetic and/or logical operations, such as, for example, one or more respective central processing units. In this embodiment, memory and/or storage each may comprise one or more of the following types of memories: semiconductor firmware memory, programmable memory, non-volatile memory, mass storage, read only memory, electrically programmable memory, random access memory, flash memory, solid state drive memory, hard/fixed disk drive memory, magnetic disk memory, optical disk memory, phase-change memory, and/or other computer-readable and/or writable memory. In this embodiment, mass storage may be or comprise storage that is capable of non-volatile storage of data, and/or from which such data stored therein may be retrieved. Additionally, in this embodiment, a hard/fixed disk drive may be or comprise, for example, one or more platters and/or disks (and/or other circuitry) to and/or from which data may be electrically and/or magnetically stored and/or retrieved, at least in part. Furthermore, in this embodiment, a solid state drive may be or comprise, for example, one or more flash and/or phase-change memory devices (and/or other circuitry) to and/or from which data may be stored and/or retrieved, at least in part.

Although not shown in the Figures, components of system 100 (e.g., nodes 20A ... 20N, 21A ... 21N, 10, and/or SN A ... N) each may comprise one or more respective single and/or multi-core host processor (HP) CPU, one or more user interfaces, and/or computer-readable/writable memories. In this embodiment, machine-readable program instructions may be stored in these computer-readable/writable memories and/or CPU. In operation, these instructions may be accessed and executed by these CPU. When so accessed and executed, this may result, at least in part, in these respective components performing the respective operations described herein as being performed by these respective components.

The not shown user interfaces each may comprise one or more respective graphical user interface systems. The respective graphical user interface systems each may comprise, e.g., one or more keyboards, pointing devices, and/or display systems that may permit one or more human users (not shown) to interact with, to input commands and/or data into, to receive data from, and/or to monitor, at least in part, one or more operations of system 100 and/or one or more components thereof.

In this embodiment, QOS may be, comprise, relate to, and/or facilitate, at least in part, differentiation, at least in part, between or among, and/or different treatment and/or processing of, at least in part, multiple packets and/or flows. Such differentiation and/or different treatment and/or processing may result in and/or from one or more QOS parameters. Also, in this embodiment, quality of experience (QOE) may be, comprise, relate to, and/or facilitate, at least in part, different user-appreciable experiences, phenomena, and/or conditions (e.g., as observed and/or perceived by different users). Such QOE may result, at least in part, from and/or in one or more QOE, QOS, and/or other parameters. For example, QOS parameters may comprise one or more respective maximum and/or minimum bandwidth, latency, jitter, absolute and/or relative throughput, relative priority, and/or other parameters that (1) are to be imposed upon respective flows, and/or (2) the respective flows are to experience. Also, for example, such QOS parameters may result, at least in part, in packets from relatively higher priority flows being received prior to receipt of packets from relatively lower priority flows. Additionally, such QOS parameters may result, at least in part, from and/or in QOE parameters associated with these flows. For example, in the case of audio and/or video streaming flows, such QOE conditions and/or phenomena may comprise how smooth (or choppy) users perceive the audio and/or video playbacks that result from the flows to be. In this embodiment, a flow may be or comprise, at least in part, multiple packets that (1) may have, exhibit, embody, and/or be associated with, at least in part, one or more similar and/or identical parameters, characteristics, and/or portions, and/or (2) may be desired and/or intended to undergo one or more similar and/or identical respective processings, at least in part. In this embodiment, examples of such similar and/or identical parameters, characteristics, and/or portions may comprise similar or identical (1) physical, logical, and/or virtual source and/or destination addresses, ports, identifiers, and/or applications, and/or (2) types of applications and/or uses to and/or for which data and/or commands in the packets are to be put.

In this embodiment, in operation, circuitry 118 may generate, at least in part, one or more packets 50 that may be and/or are destined to be received, at least in part, by one or more SN 102 and/or circuitry 120. These one or more packets 50 may be transmitted, at least in part, by circuitry 118, via one more links L1 . . . LN, and may be received, at least in part, by one or more SN 102 and/or circuitry 120 (e.g., via one or more ports 110C and/or 112C). In response, at least in part, to the one or more packets 50, one or more SN 102 may designate one or more (and in this embodiment, a plurality of) ports (e.g., ports 110B, 110D, 112A, and/or 112B) of one or more SN 102 (e.g., in this embodiment, SN A and/or SN B) to be used to facilitate, at least in part, establishment, at least in part, of one or more paths 106 in network 51 (e.g., from one or more nodes 20N to one or more nodes 21N via one or more SN 102). One or more paths 106 may be for and/or permit propagation, at least in part, of one or more flows F1 between at least two other nodes (e.g., nodes 20N and 21N) in network 51. In this embodiment, one or more packets 50 may be generated, at least in part, by circuitry 118, based, at least in part, upon one or more of the following: (1) one or more application classifications (AC) 52A indicated, at least in part, in one or more packets (e.g., one or more packets 54A) that may belong to one or more flows F1, (2) one or more requests 56 for one or more allocations (e.g., of bandwidth and/or one or more path allocations) related to, permitting, and/or resulting in, at least in part, achievement of QOS/QOE and/or other parameters/conditions in the network 51 that may be associated with and/or used by, at least in part, one or more paths 106, and (3) information (e.g., one or more of information 108A . . . 108N) that may be related, at least in part, to resource availability in network 51.

For example, in operation, one or more (and in this embodiment, a plurality of) flows F1 . . . FN may be established and/or propagated in network 51. In order to establish and/or initiate propagation of one or more such flows F1 in network 51 (e.g., from one or more nodes 20N to one or more nodes 21N), one or more nodes 20N may generate and/or issue, at least in part, one or more requests 56 and/or one or more beginning packets 54A in one or more flows F1 to one or more SN A, via one or more network segments S1 and/or one or more ports 110B. As generated and/or issued, at least in part, by one or more nodes 20N, one or more packets 54A and/or requests 56 may comprise and/or indicate, at least in part, one or more AC 52A.

One or more AC 52A may be, comprise, and/or be associated with, at least in part, one or more values and/or other information. These one or more values and/or other information may be related to properly and/or efficiently establishing and/or allocating in network 51 one or more paths 106, one or more flows F1, and/or bandwidth that is be to be associated with and/or used by one or more paths 106 and/or one or more flows F1. For example, nodes 20A . . . 20N, 21A . . . 21N, 102, 162, 160, and/or 10 may be pre-programmed (e.g., prior to, at least in part, generation and/or issuance, at least in part, of one or more requests 56 and/or one or more beginning packets 54A) with possible values and/or associated information from which one or more AC 52A may be selected by one or more nodes 20N, as well as, their associated meanings and/or corresponding intended types of (e.g., end user) applications. As such, in this embodiment, these possible values and/or associated information also may be associated, at least in part, with corresponding QOS and/or QOE to be provided, at least in part, to flows associated with these possible values and/or associated information. For example, one or more AC 52A may indicate, at least in part, that one or more flows F1 are to be used to provide streaming video to one or more nodes 21N. The bandwidth and/or path allocations that may be associated, at least in part, with such streaming video application may be relatively better and/or of higher priority and/or less latency than other possible types of applications that might, in a different example, have been indicated by one or more AC 52A. For example, other possible values and/or associated information that may be indicated, at least in part, by one or more AC 52A may indicate and/or be associated with, at least in part, telephony, teleconferencing, online gaming, and/or other applications, whose bandwidth and/or path allocations may be relatively lesser, slower, lower priority, etc. than those of streaming video. Such pre-programming may be established, at least in part, by, for example, (1) negotiation between and/or among these nodes, (2) network administrator programming (e.g., of the one or more nodes 162, 160, and/or 10, control plane 152, and/or circuitry 118), and/or (3) controlling, at least in part, the operation of one or more nodes SN A . . . SN N and/or 102 by one or more nodes 162, 160, and/or 10 (e.g., in the manner described herein) so as to enforce, at least in part, appropriate QOS/QOE parameters in data plane 150.

In this embodiment, one or more requests 56 may be, comprise, and/or be comprised in, at least in part, one or more packets. Also in this embodiment, one or more AC 52A may be comprised, at least in part, in, for example, one or more type of service (TOS) and/or differentiated services code point (DSCP) fields and/or values in one or more headers of one or more requests 56 and/or one or more packets 54A. For example, such TOS and/or DSCP fields and/or values may be compatible with, at least in part, "Internet Protocol," Request For Comments (RFC) 791, DARPA Internet Program, published September 1981, and/or "Definition of the Differentiated Services Field (DS Field) in the IPv4 and IPv6 Headers," RFC 2474, The Internet Society, published December 1998. Of course, many variations and alternatives are possible without departing from this embodiment, including those that may involve use of other protocols, fields, values, etc.

In response, at least in part, to one or more packets 54A and/or one or more requests 56, one or more SN A may transmit, at least in part, one or more requests 56 and/or packets 54A to one or more controllers 10 via one or more links L1. In response, at least in part, to one or more requests 56 and/or packets 54A, one or more SDN controller nodes 10, circuitry 118, and/or one or more FCN 160 may examine, at least in part, one or more requests 56 and/or one or more packets 54A, and may provide to one or more QOS controller nodes 162 one or more AC 52A. In this embodiment, communication between or among nodes 160 and/or 162 may be carried out, at least in part, using, for example, one or more inter-process communication mechanisms and/or techniques.

One or more QOS controller nodes 162 may maintain, at least in part, one or more databases (not shown) that may associate, at least in part, possible AC values and/or information 52A . . . 52N with associated corresponding QOS values 170A . . . 170N, QOE values 140A . . . 140N, and/or other parameters 142A . . . 142N. These corresponding values 170A . . . 170N, 140A . . . 140N, and/or parameters 142A . . . 142N may identify, indicate, and/or define, at least in part, the respective QOS, QOE, and/or other network parameters that may be intended to be used for and/or assigned to flows associated with these associated possible AC values 52A . . . 52N. In response, at least in part, to one or more AC 52A, one or more QOS controller nodes 162 may provide, at least in part, circuitry 118 and/or one or more FCN 160 with the one or more QOS values 170A, QOE values 140A, and/or other parameters 142A that may be associated, at least in part, with one or more AC 52A.

In response to and/or based upon, at least in part, these values 170A and/or 140A, other parameters 142A, and/or one or more portions of network resource information 108A . . . 108N, one or more FCN 160 and/or circuitry 118 may generate, at least in part, one or more packets 50. One or more packets 50 may comprise and/or indicate, at least in part, information 53 that may specify and/or indicate, at least in part, one or more paths 106 (and/or information related thereto). Information 53 may be used, at least in part, to facilitate establishment, at least in part, of one or more paths 106.

For example, components of network 51, such as, circuitry 120, one or more SN 102 and/or one or more of SN A . . . SN N may provide, at least in part, to one or more nodes 10, 162, and/or 160, and/or circuitry 118 information 108A . . . 108N that may relate, at least in part, to resource availability in the network 51. In this embodiment, such resource availability information 108A . . . 108N may concern, be, and/or comprise, at least in part, the availability, loading, balancing, power consumption, ability to take on additional workload and/or processing, current/expected processing latency, current/expected processing bandwidth consumption, etc. of virtual, physical, and/or logical features, instrumentalities, and/or functions (1) the components providing such information 108A . . . 108N, (2) communication links, network segments, and/or ports that may be communicatively coupled directly or indirectly to such components, and/or (3) other components of the network 51 and/or components of the subnets 25A . . . 25N. The components of network 51 that may provide information 108A . . . 108N may update (e.g., periodically) such information 108A . . . 108N over time, so as to permit circuitry 118, one or more controller nodes 10, and/or one or more FCN 160 to be provided with, at least in part, information that is meaningfully indicative of reasonably current and/or real time information of current resource availability in data plane 150. Additionally or alternatively, depending upon the particular implementation, without departing from this embodiment, such information 108A . . . 108N may be meaningfully indicative of reasonably current and/or real time information of current resource availability in one or more other portions of the network 51.

Based at least in part upon values 170A and/or 140A, other parameters 142A, and/or one or more portions of network resource information 108A . . . 108N, one or more FCN 160 and/or circuitry 118 may generate, at least in part, information 53 such that the one or more paths 160 (and/or other information) comprised and/or indicated, at least in part, in information 53 may be chosen so as to take into account (1) past, present, and/or future resource availability, allocation, and/or bandwidth in the network 51, and/or (2) the QOS, QOE, and/or other parameters associated with one or more flows F1 and/or one or more AC 52A. For example, in order to provide the one or more streaming video flows F1 with these desired QOS, QOE, and/or parameters, the one or more paths 106 (and also, therefore, information 53) may be selected so as to permit the one or more flows F1 and/or the video playback thereof to exhibit, at least in part, the maximum and/or minimum bandwidth, latency, jitter, absolute and/or relative throughput, relative priority, playback smoothness, other parameters, etc. that may be indicated, at least in part, by the values 170A, 140A, and/or other parameters 142A.

In response to, at least in part, receipt by circuitry 120, one or more SN 102 and/or SN A . . . SN N of one or more packets 50, circuitry 120, one or more SN 102 and/or SN A . . . SN N may establish and/or modify, at least in part, their respective forwarding tables (not shown) so to establish, at least in part, that one or more paths 106 are to be used, at least in part, to forward packets 54A . . . 54N belonging to one or more flows F1. This may result, at least in part, in circuitry 120, one or more SN 102, and/or SN A . . . N designating, at least in part, one or more ports (e.g., ports 110B, 110D, 112A, and/or 112B) of the circuitry 120, one or more SN 102, and/or SN A . . . N to be used to facilitate, at least in part, of the one or more paths 106. For example, one or more paths 106 may comprise one or more segments S1 between one or more nodes 20N and one or more ports 110B, one or more segments S2 between one or more ports 110D and one or more ports 112A, and/or one or more segments S3 between one or more ports 112B and one or more nodes 21N.

Accordingly, after and/or contemporaneously with establishment, at least in part, of one or more paths 106 via such establishment and/or modification of such forwarding tables, the respective packets 54A . . . 54N of one or more flows F1 may be transmitted from one or more nodes 20N to one or more ports 110B via one or more segments S1. Thence, one or more SN A and/or circuitry 118 may forward the respective packets 54A . . . 54N to one or more SN N via one or more ports 110D, one or more segments S2, and/or one or more ports 112A. Thence, one or more SN N and/or circuitry 118 may forward the respective packets 54A . . . 54N to one or more nodes 21N via one or more ports 112B and/or one or more segments S3.

Figure 2:
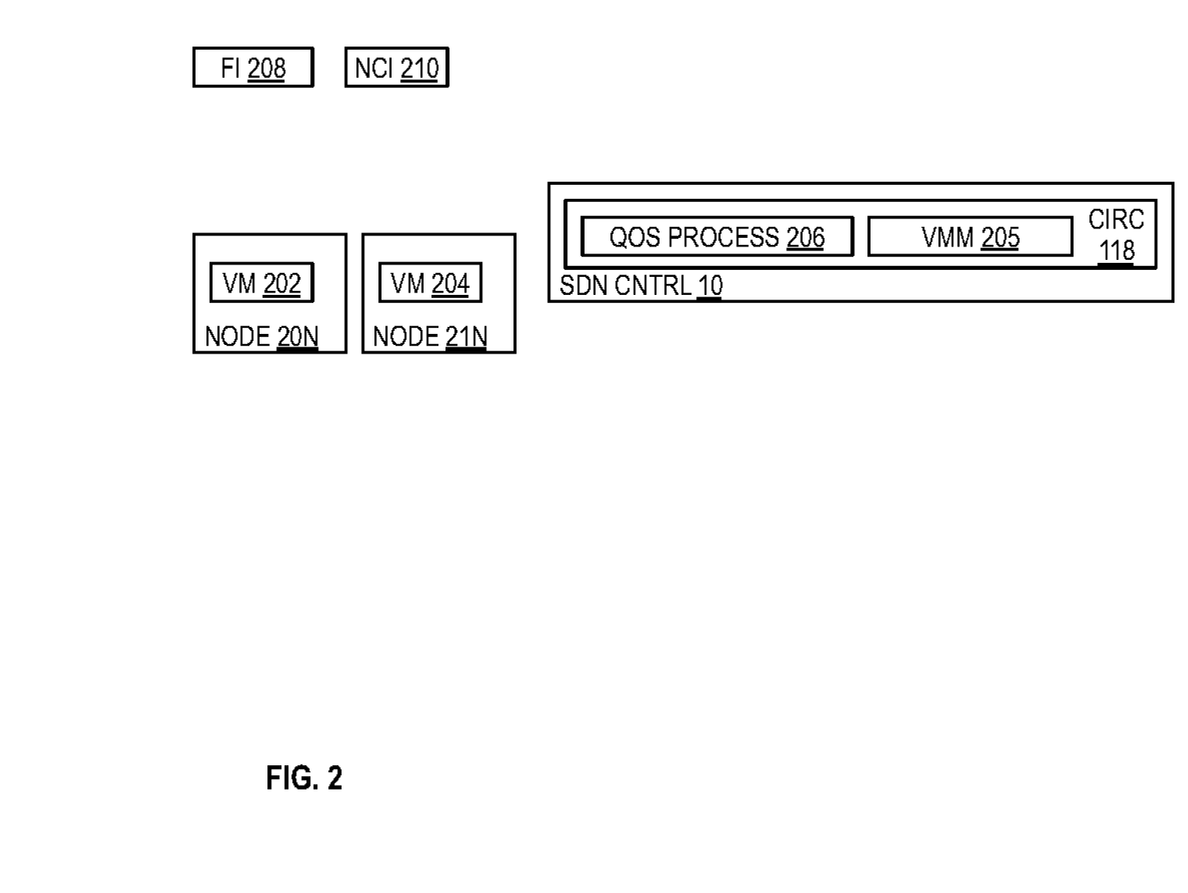
FIG. 2 illustrates elements in an embodiment.

Many modifications, variations, and alternatives are possible. For example, without departing from this embodiment, each of the nodes 20A . . . 20N and/or 21A . . . 21N may execute, comprise, or be comprised in, at least in part, one or more respective VM. For example, as shown in FIG. 2, nodes 20N and/or 21N each may execute, comprise, and/or be comprised in, one or more respective VM 202 and/or 204. Also, for example, circuitry 118 and/or one or more controller nodes 10 may execute and/or comprise, at least in part, one or more VMM and/or VMM software processes 205 and/or one or more QOS software processes 206. In this embodiment, one or more VMM 205 may (1) control, at least in part, operation and/or instantiation of the VM 202 and/or 204, and/or (2) perform, at least in part, the operations previously described herein as being performed, at least in part, by one or more FCN 160. Also in this embodiment, one or more QOS software processes 206 may (1) perform, at least in part, the operations described herein as being performed, at least in part, by one or more QOS controller nodes 162, and/or (2) provide, at least in part, to circuitry 118 and/or VMM 205, values 170A, 140A and/or other parameters 142A. In the arrangement shown in FIG. 2, circuitry 118, one or more controller nodes 10, and/or VMM 205 may provide, at least in part, forwarding information 208 to one or more SN 102, circuitry 120, and/or SN A . . . SN N. Information 208 may comprise information 53 (and/or other information analogous to information 53). Based at least in part upon information 208, one or more SN 102, circuitry 120, and/or SN A . . . SN N may establish, at least in part, one or more paths 106. After establishing, at least in part, one or more paths 106, one or more SN 102, circuitry 120, and/or SN A . . . SN N may modify, at least in part, one or more paths 106 based at least in part upon current network congestion/condition information 210. Information 210 may be, be comprised in, and/or comprise, at least in part, (e.g., a most recent update of) information 108A . . . 108N, using techniques analogous to those described above for establishing one or more paths 106. Additionally or alternatively, without departing from this embodiment, circuitry 120 may execute and/or comprise, at least in part, one or more (not shown) software processes that may be capable of performing, at least in part, the operations described herein as being performed, at least in part, by one or more SN 102, SN A . . . SN N, and/or one or more components and/or portions thereof.

Figure 3:
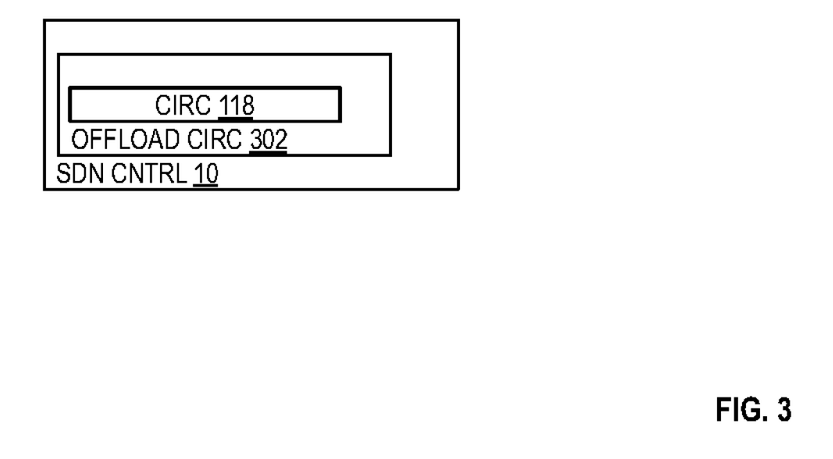
FIG. 3 illustrates elements in an embodiment.
Figure 4:
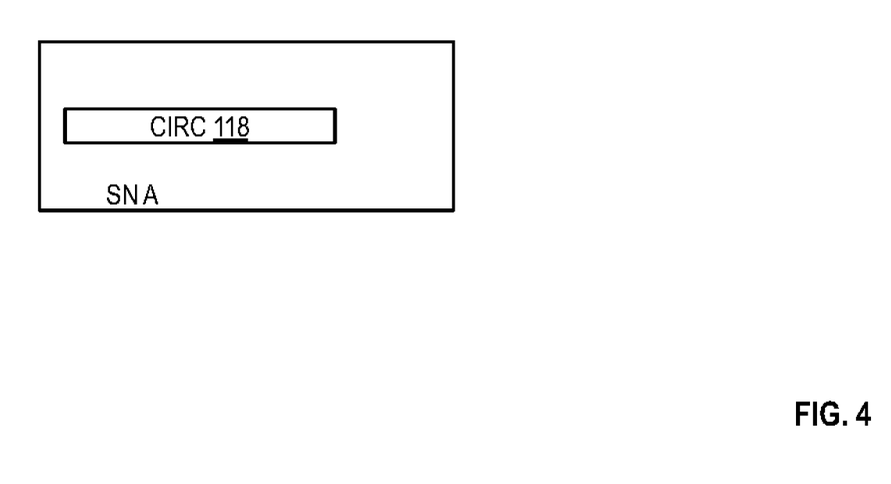
FIG. 4 illustrates elements in an embodiment.

Further alternatively or additionally, without departing from this embodiment, as shown in FIG. 3, circuitry 118 may be comprised, at least in part, in hardware offload circuitry 302 comprised, at least in part, in one or more controller nodes 10. Such offload circuitry 302 may permit one or more processes and/or operations that otherwise may be performed, at least in part, by one or more software processes (e.g., one or more VMM 205 and/or QOS processes 206) to be performed entirely or substantially, at least in part, by hardware circuitry 302. Further alternatively or additionally, without departing from this embodiment, as shown in FIG. 4, circuitry 118 may be comprised, at least in part, in one or more SN A (and/or, for example, SN 102, SN N, and/or circuitry 120), or vice versa. Further additionally or alternatively, circuitry 120 may be comprised, at least in part, in other not shown hardware offload circuitry.

In this embodiment, each of network 51, nodes 102, 10, 160, 162, and/or SN A . . . SN N may comply and/or be compatible with, at least in part, OpenFlow Switch Specification, Version 1.1.0 Implemented, OpenFlow Switch Consortium, The Board of Trustees of The Leland Stanford Junior University, Feb. 28, 2011 (hereinafter, "OpenFlow protocol"), and/or other versions of the OpenFlow protocol. Of course, without departing from this embodiment, many other protocols, including many other switch and/or communication protocols may be employed in network 51 and/or portions/components thereof.

Thus, in a first example in this embodiment, an apparatus may be provided that is to be used in association with a network. The apparatus may comprise circuitry to be comprised, at least in part, in at least one node in the network. The circuitry may perform either or both of the following conditions (a) and (b). In condition (a), the circuitry may generate, at least in part, at least one packet to be received, at least in part, by at least one switch node in the network. The at least one switch node in the network may designate, in response at least in part to the at least one packet, at least one port of the at least one switch node to be used to facilitate, at least in part, establishment, at least in part, of at least one path in the network for propagation of at least one flow between at least two other nodes in the network. The at least one packet may be generated, at least in part, based at least in part upon (1) at least one application classification indicated, at least in part, in at least one other packet that belongs to the at least one flow, (2) at least one request for one or more allocations (e.g., one or more bandwidth allocations, one or more path allocations, and/or one or more other allocations) in the network to be associated, at least in part, with the at least one path (e.g., so as to permit and/or result in, at least in part, achievement of one or more QOS, QOE, and/or other associated/related parameters/conditions), and (3) information related, at least in part, to resource availability in the network. In condition (b) of this first example, the circuitry may receive, at least in part, the at least one packet. Such other and/or related parameters/conditions may be or comprise, for example, packet ordering and/or latency conditions, tolerances, parameters, etc. Additionally or alternatively, without departing from this example, the one or more allocations may be, comprise, and/or involve, at least in part, interfacing with and/or utilizing, at least in part, one or more functions, features, etc. implemented and/or comprised, at least in part, in network 51.

In a second example of this embodiment that may comprise some or all of the elements of the first example, the at least one application classification may be associated, at least in part, with (1) quality of service to be provided, at least in part, in connection with the at least one flow, and/or (2) quality of experience to be provided, at least in part, in connection with the at least one flow.

In a third example of this embodiment that may comprise some or all of the elements of the first and/or second examples, a data plane may comprise the at least one switch node and the at least two other nodes. In this third example, a control plane may comprise at least one controller node to generate, at least in part, the at least one packet. In a fourth example of this embodiment that may comprise some or all of the elements of the third example, the at least one controller node may comprise (1) at least one fabric controller node to generate, at least in part, the at least one packet, and (2) at least one quality of service controller node to provide at least one parameter defining, at least in part, quality of service associated, at least in part, with the at least one application classification.

In a fifth example of this embodiment that may comprise some or all of the elements of any of the preceding examples, the network may comprise at least two different subnets. The at least two different subnets may comprise respective of the at least two other nodes, and the at least one switch node may comprise a plurality of switch nodes that communicatively couple the at least two different subnets.

In a sixth example of this embodiment that may comprise some or all of the elements of any of the preceding examples, the at least two other nodes each may comprise at least one respective virtual machine. At least one controller node may comprise, at least in part, the circuitry, and the at least one controller node may execute a virtual machine monitor and at least one quality of service process to provide to the circuitry at least one parameter defining, at least in part, quality of service associated, at least in part, with the at least one application classification.

In a seventh example of this embodiment that may comprise some or all of the elements of any of the preceding examples, the apparatus may satisfy at least one of the following conditions (c) to (g). In condition (c), the circuitry may execute at least one software process that may perform, at least in part, operations comprised in either or both of the conditions (a) and (b) of the first example. In condition (d), the circuitry may be comprised, at least in part, in hardware offload circuitry comprised, at least in part, in at least one software defined network controller. In condition (e), the circuitry may be comprised, at least in part, in the at least one switch node. In condition (f), the circuitry may be comprised, at least in part, in a data plane of a software-defined network. In condition (g), the at least one software defined network controller may provide, at least in part, forwarding information to the at least one switch node based, at least in part, upon which the at least one switch node is to establish, at least in part, the at least one path. Also in condition (g), the at least one switch node may modify, at least in part, the at least one path based at least in part upon network condition information.

In an eighth example of this embodiment, computer-readable memory is provided that stores one or more instructions that when executed by a machine results in the performance of operations that may comprise any combination of any of the operations performed by the circuitry and/or apparatus in any of the preceding examples. In a ninth example of this embodiment, a method is provided that may be implemented, at least in part, in a network. The method of this ninth example may comprise (1) any combination of any of the operations performed by the circuitry and/or apparatus in any of the preceding examples, and/or (2) any combination of any of the operations that may be performed by execution of the one or more instructions stored in the computer-readable memory of the eighth example of this embodiment. In a tenth example of this embodiment, means may be provided to carry out any of, and/or any combination of, the operations that may be performed by the method, apparatus, computer-readable memory, and/or circuitry in any of the preceding examples.

Advantageously, this embodiment may exhibit significantly improved scalability and reduced processing bottlenecks with increasing numbers of flows in the network. Further advantageously, this embodiment may be capable of better and/or differently forwarding, and/or of providing substantially improved (and different respective) processing between or among different respective flows, based upon respective QOS, QOE, and/or other parameters associated with the flows, and/or meaningfully current information related to resource availability in the network.

Many alternatives, modifications, and/or variations are possible without departing from this embodiment. For example, in an eleventh example of this embodiment, machine-readable memory may be provided that may store instructions and/or design data, such as Hardware Description Language, that may define one or more subsets of the structures, circuitry, apparatuses, features, etc. described herein (e.g., in any of the preceding examples of this embodiment). Accordingly, the claims are intended to embrace all such alternatives, modifications, and/or variations.

What is claimed is:

1. A controller comprising:
a processor; and
one or more storage media storing instructions that, when executed by the processor, cause the controller to:
receive, via one or more network switches, resource utilization information corresponding to a plurality of virtual machines provisioned on one or more hosts;
determine at least one usage level information for at least one of the plurality of virtual machines based on the resource utilization information; and
control at least one of the one or more network switches to balance traffic flow among the plurality of virtual machines based on the at least one usage level information.

2. The controller of claim 1, wherein controlling the one or more network switches comprises sending data to the network switches identifying the control information to cause the traffic flow to be balanced.

3. The controller of claim 1, wherein the utilization information corresponds to utilization of processor resources of the one or more hosts implementing the plurality of virtual machines.

4. The controller of claim 1, wherein the instructions, when executed, further cause the controller to implement a quality of service (QoS) process.

5. The controller of claim 1, wherein the controller is to implement a virtual machine manager corresponding to at least one of the plurality of virtual machines.

6. The controller of claim 1, wherein the one or more network switches are in a network comprising a plurality of subnets and the one or more network switches couple at least some of the subnets within the network.

7. The controller of claim 1, wherein controlling the one or more network switches comprises causing the one or more network switches to reallocate processing of a set of information flows.

8. The controller of claim 7, wherein controlling the one or more network switches comprises causing the one or more network switches to deactivate processors that are not processing information flows based on the reallocation of processing of the set of information flows.

9. The controller of claim 8, wherein reallocation of the processing of the set of information flows is based at least in part on a respective application type of each information flow in the set.

10. At least one non-transitory machine accessible storage medium having instructions stored thereon, wherein the instructions when executed on a machine, cause the machine to:
receive, via one or more network switches, resource utilization statistics corresponding to a plurality of virtual machines provisioned on one or more hosts;
determine at least one usage level information for at least one of the plurality of virtual machines based on the resource utilization statistics; and
control at least one of the one or more network switches to balance traffic flow among the plurality of virtual machines based on the at least one usage level information.

11. The storage medium of claim 10, wherein controlling the one or more network switches comprises sending data to the network switches identifying the control information to cause the traffic flow to be balanced.

12. The storage medium of claim 10, wherein the utilization information corresponds to utilization of processor resources of the one or more hosts implementing the plurality of virtual machines.

13. The storage medium of claim 10, wherein the instructions, when executed, further cause the machine to implement a quality of service (QoS) process.

14. The storage medium of claim 10, wherein the instructions, when executed, further cause the machine to implement a virtual machine manager corresponding to at least one of the plurality of virtual machines.

15. The storage medium of claim 10, wherein the one or more network switches are in a network comprising a plurality of subnets and the one or more network switches couple at least some of the subnets within the network.

16. A system comprising:
    means to receive, via one or more network switches, resource utilization information corresponding to a plurality of virtual machines provisioned on one or more hosts;
    means to determine at least one usage level information for at least one of the plurality of virtual machines based on the resource utilization information; and
    means to control at least one of the one or more network switches to balance traffic flow among the plurality of virtual machines based on the at least one usage level information.

17. A system comprising:
    one or more network switches in a network;
    a network controller to:
        receive, via one or more network switches, resource utilization information corresponding to a plurality of virtual machines provisioned on one or more hosts;
        determine at least one usage level information for at least one of the plurality of virtual machines based on the resource utilization information and the control information; and
        control at least one of the one or more network switches to balance traffic flow among the plurality of virtual machines based on the at least one usage level information.

18. The system of claim 17, wherein a particular one of the one or more network switches is to:
    detect resource availability within the network; and
    generate the resource utilization information based on the resource availability.

19. The system of claim 18, wherein the resource availability and resource utilization information is associated with one or more of detected power consumption attributes of the one or more hosts, processing latency of the one or more hosts, and bandwidth of the one or more hosts.

20. The system of claim 17, wherein at least one of the one or more network switches is implemented using virtual resources.

21. The system of claim 17, wherein controlling the one or more network switches comprises sending data to the network switches identifying the control information to cause the traffic flow to be balanced.

22. The system of claim 17, further comprising a virtual machine manager implemented using the network controller.

23. The system of claim 17, wherein controlling the one or more network switches comprises causing the one or more network switches to reallocate processing of a set of information flows.

24. The system of claim 23, wherein controlling the one or more network switches comprises causing the one or more network switches to deactivate processors of the hosts that are not processing information flows based on the reallocation of processing of the set of information flows.

* * * * *